US012804783B2

(12) United States Patent
Li

(10) Patent No.: US 12,804,783 B2
(45) Date of Patent: Nov. 17, 2026

(54) TWO-GANG DIMMER AND LINE CHECKING METHOD FOR THE TWO-GANG DIMMER

(71) Applicant: TP-LINK SYSTEMS INC., Irvine, CA (US)

(72) Inventor: Pengcheng Li, Chengdu (CN)

(73) Assignee: TP-Link Systems Inc., Irvine, CA (US)

( * ) Notice: Subject to any disclaimer, the term of this patent is extended or adjusted under 35 U.S.C. 154(b) by 106 days.

(21) Appl. No.: 18/860,600

(22) PCT Filed: Mar. 21, 2023

(86) PCT No.: PCT/CN2023/082904

§ 371 (c)(1),
(2) Date: Oct. 25, 2024

(87) PCT Pub. No.: WO2023/207436

PCT Pub. Date: Nov. 2, 2023

(65) Prior Publication Data

US 2025/0294651 A1 Sep. 18, 2025

(30) Foreign Application Priority Data

Apr. 29, 2022 (CN) ........................ 202210465557.7

(51) Int. Cl.
*H05B 45/10* (2020.01)

(52) U.S. Cl.
CPC .................................. *H05B 45/10* (2020.01)

(58) Field of Classification Search
CPC ........ H05B 45/10; H05B 47/10; H05B 47/18; H05B 47/20; Y02B 20/40; H03K 17/18
See application file for complete search history.

(56) References Cited

U.S. PATENT DOCUMENTS

2013/0020955 A1 1/2013 Igaki et al.
2017/0367156 A1 12/2017 Holleschau et al.

FOREIGN PATENT DOCUMENTS

CN 200965630 Y 10/2007
CN 102545858 A * 7/2012
CN 107357196 A * 11/2017 ......... G05B 19/0423
CN 110109403 A 8/2019
CN 211403192 U 9/2020
CN 211580242 U 9/2020
CN 114285142 A 4/2022
CN 114727451 A 7/2022
WO 2020238177 A1 12/2020

OTHER PUBLICATIONS

ISR for PCT/CN2023/082904 issued Jul. 6, 2023.
European search report of Corresponding EP application No. 23794871.6 issued on Jul. 2, 2025.

* cited by examiner

*Primary Examiner* — Georgia Y Epps
*Assistant Examiner* — Mai Thi Ngoc Tran
(74) *Attorney, Agent, or Firm* — Kilpatrick Townsend & Stockton LLP

(57) ABSTRACT

Disclosed are a two-gang dimmer and a line checking method for the two-gang dimmer. Whether lines of a master module and a slave module are reversely connected is determined according to a voltage detected by a sampling end of a sampling unit. A first input/output end and a second input/output end of the master module are interchanged by means of a switching unit, and wiring states of the master module and the slave module are switched.

16 Claims, 3 Drawing Sheets

TWO-GANG DIMMER AND LINE CHECKING METHOD FOR THE TWO-GANG DIMMER

CROSS-REFERENCE TO RELATED APPLICATION

The present disclosure is a 371 National Phase of PCT/CN2023/082904, filed Mar. 21, 2023 and entitled "Dual Dimmer And Line Check Method Therefor" which claims the priority of Chinese Patent Application No. 2022104655577, filed with the China National Intellectual Property Administration on Apr. 29, 2022 and entitled "two-gang dimmer and line checking method for the two-gang dimmer", which are incorporated herein by reference in their entirety.

TECHNICAL FIELD

The disclosure relates to the technical field of power electronics, and particularly relates to a driving circuit of a two-gang dimmer.

BACKGROUND

A three-way switch is a switch capable of controlling one device to be turned on or off at two positions. A two-gang dimmer has an additional dimming function on the basis of a control switch. A master and a slave of the two-gang dimmer are connected by two lines, and are distributed at different positions to control brightness of a loaded lamp.

In order to ensure normal operation of the two-gang dimmer, the two lines between the master and the slave need to be distinguished before used. However, in the prior art, the two lines are not marked in wiring between the master and the slave connected in the two-gang dimmer, and therefore cannot be distinguished by users. Thus, wiring errors, failure of the dimmer or damage of the dimmer is likely to be caused.

SUMMARY

An embodiment of the disclosure provides a two-gang dimmer. The two-gang dimmer includes a master module, a slave module, a switching unit, and a forward-reverse connection differential unit.

Four input/output ends on the switching unit are connected to a first input/output end and a second input/output end of the master module, and a first input/output end and a second input/output end of the slave module, respectively. The switching unit is configured to switch a connection relation between the two input/output ends of the master module and the two input/output ends of the slave module.

Two input/output ends of the forward-reverse connection differential unit are connected to the first input/output end and the second input/output end of the slave module, respectively.

The first input/output end of the master module outputs a power supply voltage to the first input/output end of the slave module. A sampling unit of the master module determines a connection relation between the master module and the slave module by detecting a voltage drop between two ends of the forward-reverse connection differential unit.

In some embodiments, the master module further includes a silicon controlled rectifier unit.

A power input end of the master module is configured to be connected to a power supply. The power input end of the master module is connected to the first input/output end of the master module and an input end of the sampling unit by means of the silicon controlled rectifier unit respectively. A sampling end of the sampling unit is connected to a second power input/output end of the master module.

The silicon controlled rectifier unit is configured to adjust a voltage output to a load.

Further, the slave module further includes a button differential unit.

An input end of the button differential unit is connected to the first input/output end of the slave module. An output end of the button differential unit is connected to the second input/output end of the slave module.

The button differential unit has several different button states. A voltage drop between the input end and the output end is different at each button state.

In some embodiments, the master module further includes a direct current conversion unit.

A power input end of the master module is configured to be connected to a power supply. The power input end of the master module is connected to the first input/output end of the master module and an input end of the sampling unit by means of the direct current conversion unit respectively. A sampling end of the sampling unit is connected to a second power input/output end of the master module.

The direct current conversion unit is configured to convert an alternating current input from the power input end of the master module into a direct current so as to be output.

In some embodiments, the switching unit includes two single-pole double-throw switches including a first single-pole double-throw switch and a second single-pole double-throw switch.

A moving end of the first single-pole double-throw switch is connected to a third input/output end of the switching unit. A first fixed end of the first single-pole double-throw switch is connected to a first input/output end of the switching unit. A second fixed end of the first single-pole double-throw switch is connected to a second input/output end of the switching unit.

A moving end of the second single-pole double-throw switch is connected to a fourth input/output end of the switching unit. A first fixed end of the second single-pole double-throw switch is connected to a second input/output end of the switching unit. A second fixed end of the second single-pole double-throw switch is connected to a first input/output end of the switching unit.

In some embodiments, the switching unit includes a double-pole double-throw switch.

The double-pole double-throw switch is used as a reversing switch of the first input/output end, the second input/output end, a third input/output end and a fourth input/output end of the switching unit.

In some embodiments, the forward-reverse connection differential unit includes a general-purpose diode and a light emitting diode.

An anode of the general-purpose diode is connected to a second input/output end of the forward-reverse connection differential unit. A cathode of the general-purpose diode is connected to a first input/output end of the forward-reverse connection differential unit.

An anode of the light emitting diode is connected to a first input/output end of the forward-reverse connection differential unit. A cathode of the light emitting diode is connected to a second input/output end of the forward-reverse connection differential unit.

As an improvement in the solution, the button differential unit includes N general-purpose diodes and N+1 button switches, where N≥1.

Anodes and cathodes of the N general-purpose diodes are alternately connected in sequence and connected in series between the input end and the output end of the button differential unit.

A first end of an ith button switch is connected to an anode of an ith general-purpose diode. A first end of an (N+1)th button switch is connected to a cathode of an Nth general-purpose diode. Second ends of the N+1 button switches are all connected to the output end of the button differential unit, where 1≤i≤N.

Another embodiment of the disclosure provides a line checking method for the two-gang dimmer. The method is applied to any one of the two-gang dimmers according to the above embodiments. The method includes the following steps:

- a switching unit is controlled, such that two input/output ends of a master module are connected to one input/output end of a slave module separately;
- a voltage value of an input signal at a sampling end of a sampling unit is detected; and
- in response to determining that the voltage value is not within a preset voltage range, it is determined that lines of the master module and the slave module are reversely connected, and a connection relation between the master module and the slave module is switched by means of the switching unit.

Yet another embodiment of the disclosure provides a line checking method for the two-gang dimmer. The method is applied to the two-gang dimmer according to the above embodiments. A master module of the two-gang dimmer includes a sampling unit and a silicon controlled rectifier unit. A slave module of the two-gang dimmer includes a button differential unit. The method includes the following steps:

- a switching unit is controlled, such that two input/output ends of a master module are connected to one input/output end of a slave module separately;
- a voltage value of an input signal at a sampling end of a sampling unit is detected;
- in response to determining that the voltage value is within a voltage range, it is determined that lines of the master module and the slave module are normally connected, and the silicon controlled rectifier unit is controlled to supply power to a load; and
- a voltage output to the load is adjusted by controlling the silicon controlled rectifier unit of the master module.

Further, after the silicon controlled rectifier unit is controlled to supply power to the load, the method further includes the following steps:

- a voltage collected by the sampling unit is compared with a preset voltage-state table, a button state of the button differential unit is determined, and according to the determined button state, the silicon controlled rectifier unit is controlled to output a corresponding output voltage to supply power to the load according to a preset state-voltage table.

The voltage-state table includes a correspondence between the collected voltage and the button state. The state-voltage table includes a correspondence between the button state and the output voltage.

DETAILED DESCRIPTION OF THE EMBODIMENTS

Technical solutions in embodiments of the disclosure will be clearly and completely described below with reference to the accompanying drawings in the embodiments of the disclosure. Obviously, the described embodiments are merely some embodiments rather than all embodiments of the disclosure. On the basis of the embodiments of the disclosure, all other embodiments obtained by those of ordinary skill in the art without making creative efforts fall within the protection scope of the disclosure.

Embodiment 1

Figure 1:
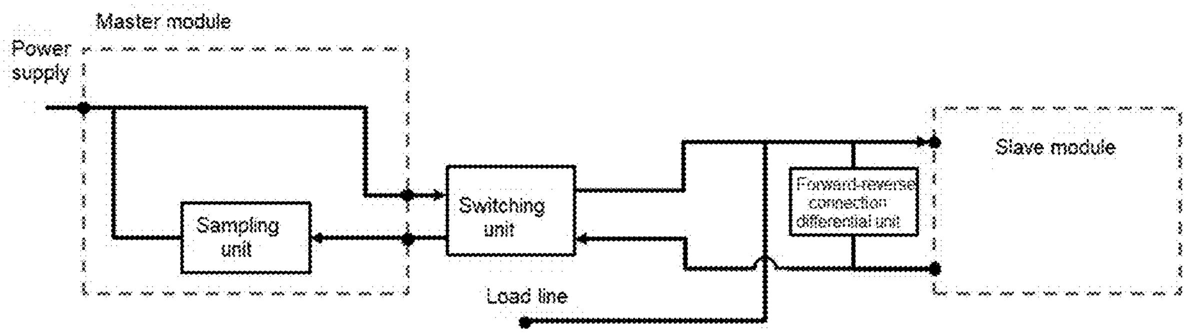
FIG. 1 is a schematic structural diagram of a two-gang dimmer according to an embodiment of the disclosure.

FIG. 1 is a schematic structural diagram of a two-gang dimmer according to an embodiment of the disclosure. The two-gang dimmer includes a master module, a slave module, a switching unit, and a forward-reverse connection differential unit.

The master module includes a sampling unit.

A power input end of the master module of the two-gang dimmer is connected to a power supply of the two-gang dimmer. The power supply supplies power to the two-gang dimmer.

The power input end of the master module is connected to a first input/output end of the master module. A first input/output end of the switching unit is connected to the first input/output end of the master module. An input end of the sampling unit is connected to the first input/output end of the switching unit. A sampling end of the sampling unit is connected to a second input/output end of the switching unit. A third input/output end of the switching unit is connected to a first input/output end of the slave module. A fourth input/output end of the switching unit is connected to a second input/output end of the slave module.

A first input/output end of the forward-reverse connection differential unit is connected to the first input/output end of the slave module. A second input/output end of the forward-reverse connection differential unit is connected to the second input/output end of the slave module. The first input/output end of the slave module is configured to be connected to a load.

The switching unit is configured to implement switching between a wiring state in which the first input/output end is connected to the third input/output end and the second input/output end is connected to the fourth input/output end, and a wiring state in which the first input/output end is connected to the fourth input/output end and the second input/output end is connected to the fourth input/output end.

A voltage drop between the first input/output end and the second input/output end of the forward-reverse connection differential unit is different from that between the second input/output end and the first input/output end.

The sampling unit is configured to collect a voltage of an input signal at the sampling end.

In response to determining normal wiring of the two-gang dimmer, the power supply is connected to the first input/output end of the slave module by means of the first input/output end of the master module, and power is supplied to the load by means of a load line. A control state of the slave module is fed back to the sampling end of the sampling unit by means of the second input/output end of the slave module.

In an actual wiring process, before power is supplied to the load, the first input/output ends and the second input/output ends of the master module and the slave module may be reversely connected. In this case, since the voltage drop between the first input/output end and the second input/output end of the forward-reverse connection differential unit is different from that between the second input/output end and the first input/output end, the voltage drop on the forward-reverse connection differential unit may change. In this case, the sampling unit may determine reverse connection of the lines through the voltage detected by the sampling end. The switching unit is configured to implement switching between the wiring state in which the first input/output end is connected to the third input/output end and the second input/output end is connected to the fourth input/output end, and the wiring state in which the first input/output end is connected to the fourth input/output end and the second input/output end is connected to the fourth input/output end. A connection relation between the first input/output ends and the second input/output ends of the master module and the slave module is interchanged, such that wiring is switched, wiring checking is ensured when the load is powered on, and mounting difficulty is effectively reduced.

Embodiment 2

Figure 2:
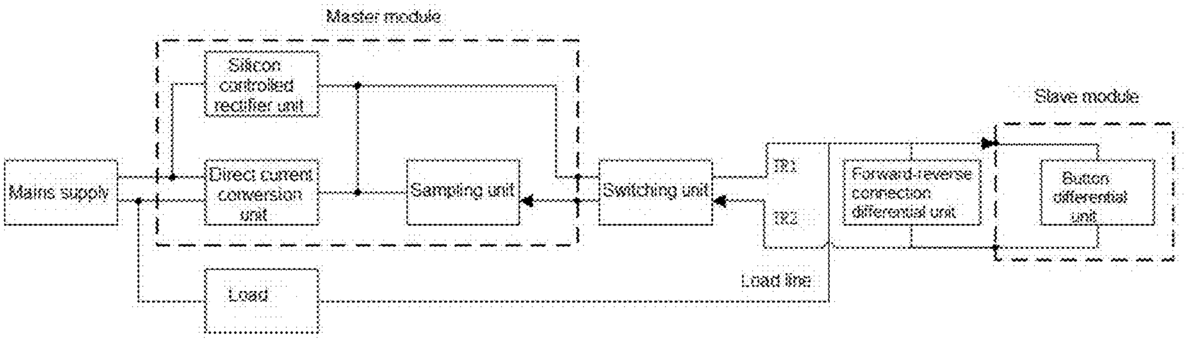
FIG. 2 is a schematic structural diagram of a two-gang dimmer according to another embodiment of the disclosure.

FIG. 2 is a schematic structural diagram of a two-gang dimmer according to another embodiment of the disclosure. A master module further includes a silicon controlled rectifier unit.

An input end of the silicon controlled rectifier unit is connected to a power input end of the master module. An output end of the silicon controlled rectifier unit is connected to a first input/output end of the master module and an input end of a sampling unit separately. A sampling end of the sampling unit is connected to a second input/output end of the master module.

The power input end of the master module may be connected to a mains supply. The silicon controlled rectifier unit is configured to adjust an intensity of a voltage output to a load.

Specifically, the silicon controlled rectifier unit is composed of silicon controlled rectifier elements, which may conveniently adjust an output voltage of an output end of the silicon controlled rectifier unit.

The silicon controlled rectifier unit is used as a dimming element of the master module. The intensity of the voltage output to the load is adjusted by adjusting a voltage output by the silicon controlled rectifier unit, such that a dimming function is achieved.

Embodiment 3

With reference to FIG. 2, a slave module further includes a button differential unit.

The button differential unit and a forward-reverse connection differential unit are connected in parallel. That is, an input end of the button differential unit is connected to a first input/output end of the slave module, and an output end of the button differential unit is connected to a second input/output end of the slave module.

The button differential unit has several different button states. A voltage drop between the input end and the output end is different at each button state. A voltage drop between the first input/output end and the second input/output end of the slave module may be changed by changing the button state of the button differential unit of the slave module. A voltage at the second input/output end of the slave module is collected by means of a sampling unit, and the button state of the button differential unit is identified. According to the button state, a silicon controlled rectifier unit is controlled to change a voltage output to a load, such that the slave module may control the load.

Embodiment 4

With reference to FIG. 2, a master module further includes a direct current conversion unit. An input end of the direct current conversion unit is connected to a power input end of the master module. An output end of the direct current conversion unit is connected to a first input/output end of the master module.

The direct current conversion unit is configured to convert an alternating current input from the power input end into a direct current so as to be output to a forward-reverse connection differential unit of a switching unit.

It should be noted that the direct current conversion unit may be specifically one isolated alternating current-direct current (AC-DC) converter, and is configured to convert the alternating current into the direct current, so as to determine forward-reverse connection.

Embodiment 5

Figure 3:
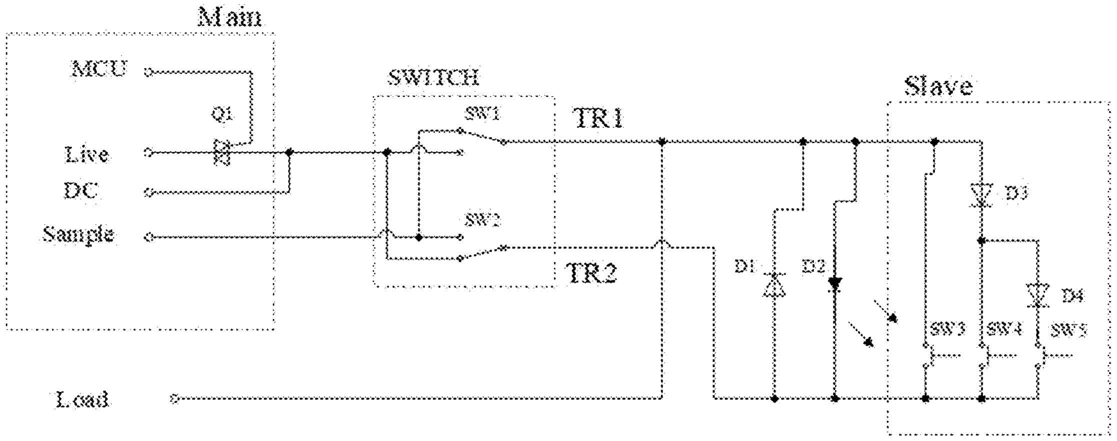
FIG. 3 is a schematic circuit diagram of a two-gang dimmer according to yet another embodiment of the disclosure.

FIG. 3 is a schematic circuit diagram of a two-gang dimmer according to yet another embodiment of the disclosure. A switching unit SWITCH of a master module Main includes two single-pole double-throw switches, that is, a first single-pole double-throw switch SW1 and a second single-pole double-throw switch SW2.

A moving end of the first single-pole double-throw switch SW1 is connected to a third input/output end of the switching unit SWITCH. A first fixed end of the first single-pole double-throw switch SW1 is connected to a first input/output end of the switching unit SWITCH. A second fixed end of the first single-pole double-throw switch SW1 is connected to a second input/output end of the switching unit SWITCH.

A moving end of the second single-pole double-throw switch SW2 is connected to a fourth input/output end of the switching unit SWITCH. A first fixed end of the second single-pole double-throw switch SW2 is connected to a second input/output end of the switching unit SWITCH. A second fixed end of the second single-pole double-throw switch SW2 is connected to a first input/output end of the switching unit SWITCH. The third input/output end of the switching unit SWITCH is connected to a load line load, such that power is supplied to a load.

By means of the two single-pole double-throw switches, the third input/output end of the switching unit may be connected to the first input/output end and the second input/output end, and the fourth input/output end may be connected to the first input/output end and the second input/output end, respectively. In this way, switching may be implemented between a wiring state in which the first input/output end is connected to the third input/output end and the second input/output end is connected to the fourth input/output end, and a wiring state in which the first input/output end is connected to the fourth input/output end and the second input/output end is connected to the fourth input/output end.

The first input/output end of the switching unit SWITCH is connected to a direct current (DC) end of the master module. The first input/output end of the switching unit SWITCH is further connected to a mains supply Live by means of a silicon controlled rectifier unit Q1. A control end of the silicon controlled rectifier unit Q1 is connected to a micro control unit (MCU). The MCU outputs a control signal to control the silicon controlled rectifier unit. The second input/output end of the switching unit SWITCH is connected to a sampling end sample of a sampling unit of the master module. The sampling unit collects a voltage at the second input/output end of the switching unit. Whether lines TR1 and TR2 between the master module and a slave module are reversely connected is identified. When the lines are reversely connected, the first input/output end and the second input/output end of the master module are interchanged by means of the first single-pole double-throw switch SW1 and the second single-pole double-throw switch SW2 of the switching unit SWITCH, such that the lines are switched.

Embodiment 6

A switching unit may also be one double-pole double-throw switch, and has six wiring ends. A wiring method is similar to that of the first single-pole double-throw switch SW1 and the second single-pole double-throw switch SW2 in the above embodiment.

In this way, a reversing switch of a first input/output end, a second input/output end, a third input/output end and a fourth input/output end is implemented.

It should be noted that the switching unit in the embodiment may be another component capable of switching the first input/output end, the second input/output end, the third input/output end, and the fourth input/output end.

Embodiment 7

With reference to FIG. 3, a forward-reverse connection differential unit of a slave module slave includes a general-purpose diode D1 and a light emitting diode D2.

An anode of the general-purpose diode D1 is connected to a second input/output end of the forward-reverse connection differential unit. A cathode of the general-purpose diode D1 is connected to a first input/output end of the forward-reverse connection differential unit.

An anode of the light emitting diode D2 is connected to a first input/output end of the forward-reverse connection differential unit. A cathode of the light emitting diode D2 is connected to a second input/output end of the forward-reverse connection differential unit.

A voltage drop of the general-purpose diode D1 is obviously different from that of the light emitting diode D2. A sampling unit may identify whether lines between a master module and a slave module are connected reversely by detecting different voltage drops in cases of forward connection and reverse connection.

It should be noted that, in other embodiments, the general-purpose diode D1 and the light emitting diode D2 of the forward-reverse connection differential unit may also be replaced by two other components that are in a unidirectional-continuity state and have a large difference in voltage drop.

Embodiment 8

With reference to FIG. 3, with a number of general-purpose diodes and a number of button switches as 2 and 3 respectively as an instance, a specific structure of a button differential unit is described.

The button differential unit includes a third general-purpose diode D3, a fourth general-purpose diode D4, a third button switch SW3, a fourth button switch SW4, and a fifth button switch SW5.

An anode of the third general-purpose diode D3 is connected to an input end of the button differential unit. A cathode of the third general-purpose diode D3 is connected to an anode of the fourth general-purpose diode D4. A cathode of the fourth general-purpose diode D4 is connected to an output end of the button differential unit by means of the fifth button switch SW5. The anode of the third general-purpose diode D3 is connected to the output end of the button differential unit by means of the third button switch SW3. The anode of the fourth general-purpose diode D4 is connected to the output end of the button differential unit by means of the fourth button switch SW4.

A number of button states of the button differential unit depend on the number of button switches. In the embodiment, the number of button states of the button differential unit is three, and voltage drops on the button differential unit are different when different button switches are pressed. In response to simultaneous pressing on a plurality of button switches, a voltage drop of a button switch in a first order is computed, and subsequent lines are short-circuited.

It should be noted that voltage drops of the general-purpose diodes in the button differential unit may same or not. Several general-purpose diodes may also be replaced by other voltage drop elements. The button switches may also be replaced by other switch devices.

By detecting a voltage of a signal fed back by a slave module, a sampling unit may identify the button state of the button differential unit, such that a silicon controlled rectifier unit may be controlled to change an intensity of a voltage output to a load according to the button state, and the slave module may control the load.

Embodiment 9

Figure 4:
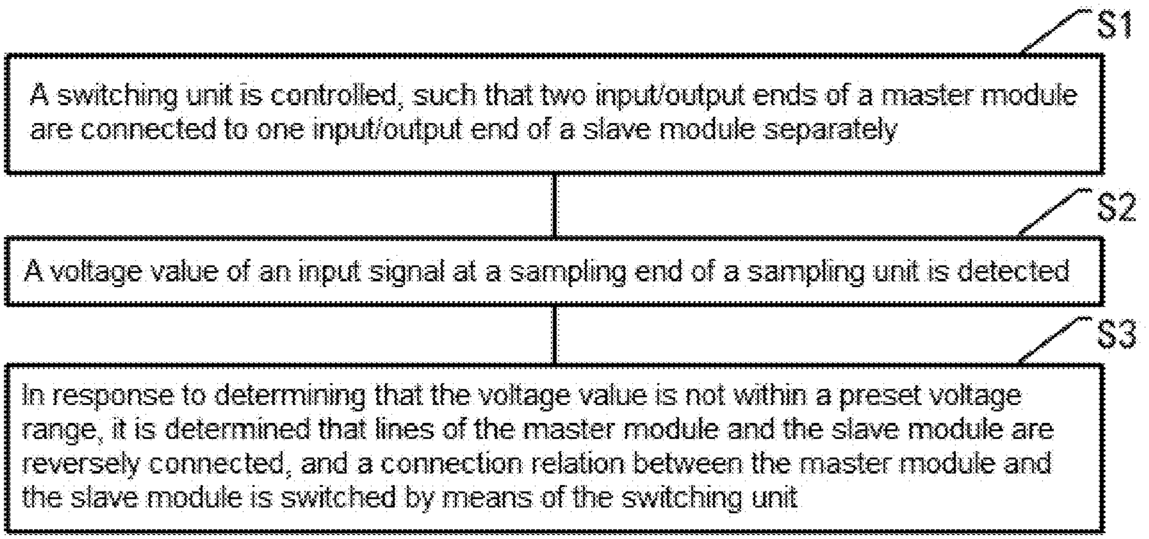
FIG. 4 is a schematic flow diagram of a line checking method for the two-gang dimmer according to yet another embodiment of the disclosure.

FIG. 4 is a schematic flow diagram of a line checking method for the two-gang dimmer according to yet another embodiment of the disclosure. The method is applied to the two-gang dimmer according to any one of the above embodiments. The method includes S1-S4:

S1, a switching unit is controlled, such that two input/output ends of a master module are connected to one input/output end of a slave module separately;

S2, a voltage value of an input signal at a sampling end of a sampling unit is detected;

S3, in response to determining that the voltage value is within a voltage range, it is determined that lines of the master module and the slave module are normally connected, and a silicon controlled rectifier unit is controlled to supply power to a load; and S4, a voltage output to the load is adjusted by controlling the silicon controlled rectifier unit of the master module.

During specific implementation of the embodiment, the switching unit is connected to a line in any wiring state, such that the two input/output ends of the master module are connected to the input/output end of the slave module separately. In a normal wiring state, a first input/output end and a second input/output end between the master module and the slave module may be connected. However, in actual mounting, a first input/output end of the master module may be connected to a second input/output end of the slave module, and a second input/output end of the master module may be connected to a first input/output end of the slave module.

The voltage value of the input signal at the sampling end of the sampling unit is detected. A voltage drop of a power supply end after passing a forward-reverse connection differential unit of the slave module is computed. If connection is normal, the voltage drop is within a preset voltage range. The voltage range may be a voltage range of lines normally connected, and determined through several experiments.

In an actual wiring process, before power is supplied to the load, the first input/output ends and the second input/output ends of the master module and the slave module may be reversely connected. In this case, since the voltage drop between the first input/output end and the second input/output end of the forward-reverse connection differential unit is different from that between the second input/output end and the first input/output end, the voltage drop on the forward-reverse connection differential unit may change. In this case, the sampling unit may determine reverse connection of the lines through the voltage detected by the sampling end. The switching unit is configured to implement switching between the wiring state in which the first input/output end is connected to the third input/output end and the second input/output end is connected to the fourth input/output end, and the wiring state in which the first input/output end is connected to the fourth input/output end and the second input/output end is connected to the fourth input/output end. The first input/output end and the second input/output end of the master module are interchanged, such that wiring is switched, wiring checking is ensured when the load is powered on, and mounting difficulty is effectively reduced. Reverse wiring is avoided, and security of the dimmer is ensured.

Embodiment 10

Figure 5:
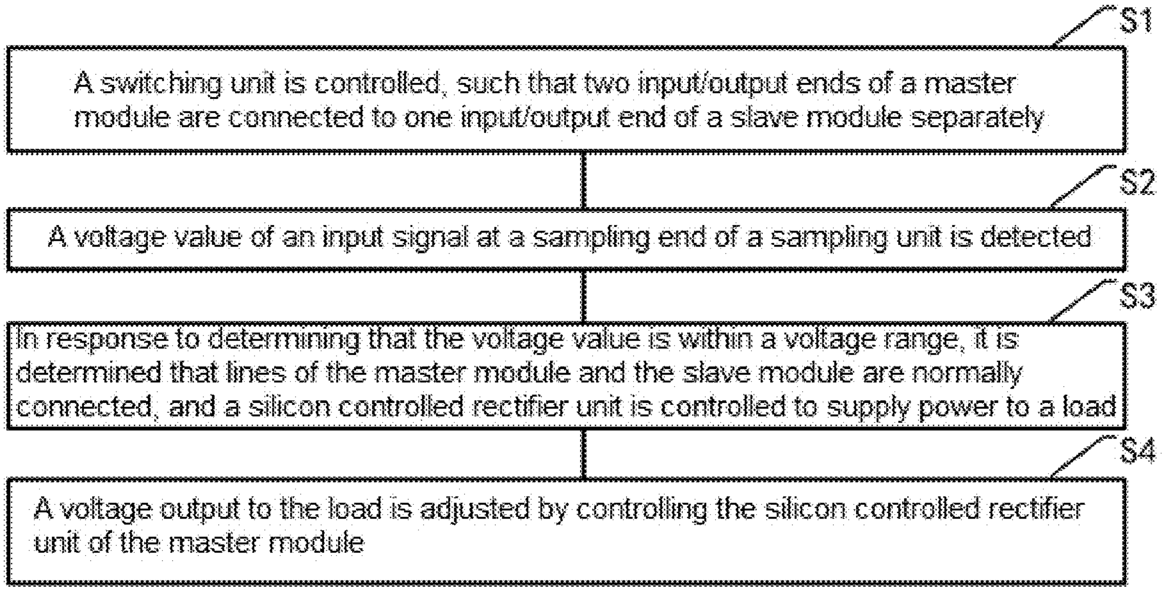
FIG. 5 is a schematic flow diagram of a line checking method for the two-gang dimmer according to still another embodiment of the disclosure.

FIG. 5 is a schematic flow diagram of a line checking method for the two-gang dimmer according to yet another embodiment of the disclosure. The method is applied to the two-gang dimmer according to Embodiment 3. A master module of the two-gang dimmer includes a sampling unit and a silicon controlled rectifier unit. A slave module of the two-gang dimmer includes a button differential unit. The method includes the following S1-S4:

- S1, a switching unit is controlled, such that two input/output ends of a master module are connected to one input/output end of a slave module separately;
- S2, a voltage value of an input signal at a sampling end of a sampling unit is detected;
- S3, in response to determining that the voltage value is within a voltage range, it is determined that lines of the master module and the slave module are normally connected, and a silicon controlled rectifier unit is controlled to supply power to a load; and
- S4, a voltage output to the load is adjusted by controlling the silicon controlled rectifier unit of the master module.

During specific implementation of the embodiment, the switching unit is connected to a line in any wiring state, such that the two input/output ends of the master module are connected to the input/output end of the slave module separately. In a normal wiring state, a first input/output end and a second input/output end between the master module and the slave module may be connected. However, in actual mounting, a first input/output end of the master module may be connected to a second input/output end of the slave module, and a second input/output end of the master module may be connected to a first input/output end of the slave module.

The voltage value of the input signal at the sampling end of the sampling unit is detected. The voltage value is a voltage drop of a power supply end after passing a forward-reverse connection differential unit of the slave module. If connection is normal, the voltage drop is within a preset voltage range. The voltage range may be a voltage range of lines normally connected, and determined through several experiments.

In an actual wiring process, before power is supplied to the load, the sampling unit may identify a voltage at an output end of the slave module by means of the sampling end. If the voltage value of the output voltage is within a voltage range, it is determined that wiring between the master module and the slave module is normal, and the silicon controlled rectifier unit is controlled to supply power to the load. Wiring checking is ensured when the load is powered on, and line security is ensured.

The voltage output to the load is adjusted by controlling the silicon controlled rectifier unit of the master module, such that dimming control of the load is implemented.

Embodiment 11

After a silicon controlled rectifier unit is controlled to supply power to a load, the method further includes the following steps:

- a voltage collected by a sampling unit is compared with a preset voltage-state table, a button state of a button differential unit is determined, and according to the determined button state, a silicon controlled rectifier unit is controlled to output a corresponding output voltage to supply power to a load according to a preset state-voltage table.

The voltage-state table includes a correspondence between the collected voltage and the button state. The state-voltage table includes a correspondence between the button state and the output voltage.

During specific implementation of the embodiment, after the silicon controlled rectifier unit is controlled to supply power to the load, dimming of the load may also be implemented by means of the button differential unit of a slave module. The button differential unit has several different button states. A voltage drop between an input end and an output end is different at each button state. A voltage drop between a first input/output end and a second input/output end of the slave module may be changed by changing the button state of the button differential unit of the slave module. A voltage at the second input/output end of the slave module is collected by means of a sampling unit.

A voltage collected by the sampling unit is compared with a preset voltage-state table, and a button state of the button differential unit is determined. The voltage-state table includes the correspondence between the collected voltage and the button state.

According to the determined button state, the silicon controlled rectifier unit is controlled to output a corresponding output voltage to supply power to the load according to a preset state-voltage table. The state-voltage table includes the correspondence between the button state and the output voltage.

The voltage is detected by means of the sampling unit, such that the button state of the button differential unit is identified, the silicon controlled rectifier unit is controlled to change the voltage output to the load according to the button state, and the slave module controls the load.

It should be noted that those of ordinary skill in the art can also make some improvements and modifications without departing from the principle of the disclosure, and these improvements and modifications should also fall within the protection scope of the disclosure.

What is claimed is:

1. A two-gang dimmer, comprising a master module, a slave module, a switching unit, and a forward-reverse connection differential unit, wherein four input/output ends on the switching unit are connected to a first input/output end and a second input/output end of the master module, and a first input/output end and a second input/output end of the slave module, respectively, and the switching unit is configured to switch a connection relation between the two input/output ends of the master module and the two input/output ends of the slave module;

a first input/output end and a second input/output end of the forward-reverse connection differential unit are connected to the first input/output end and the second input/output end of the slave module, respectively; and the first input/output end of the master module outputs a power supply voltage to the first input/output end of the slave module; and a sampling unit of the master module determines a connection relation between the master module and the slave module by detecting a voltage drop between two ends of the forward-reverse connection differential unit;

the forward-reverse connection differential unit comprises a general-purpose diode and a light emitting diode;

an anode of the general-purpose diode is connected to the second input/output end of the forward-reverse connection differential unit, and a cathode of the general-purpose diode is connected to the first input/output end of the forward-reverse connection differential unit; and an anode of the light emitting diode is connected to the first input/output end of the forward-reverse connection differential unit, and a cathode of the light emitting diode is connected to the second input/output end of the forward-reverse connection differential unit.

2. The two-gang dimmer according to claim 1, wherein the master module further comprises a direct current conversion unit;

a power input end of the master module is configured to be connected to a power supply, and the power input end of the master module is connected to the first input/output end of the master module and an input end of the sampling unit by means of the direct current conversion unit respectively; and a sampling end of the sampling unit is connected to a second power input/output end of the master module; and the direct current conversion unit is configured to convert an alternating current input from the power input end of the master module into a direct current so as to be output.

3. The two-gang dimmer according to claim 1, wherein the switching unit comprises two single-pole double-throw switches comprising a first single-pole double-throw switch and a second single-pole double-throw switch;

a moving end of the first single-pole double-throw switch is connected to a third input/output end of the switching unit, a first fixed end of the first single-pole double-throw switch is connected to a first input/output end of the switching unit, and a second fixed end of the first single-pole double-throw switch is connected to a second input/output end of the switching unit; and a moving end of the second single-pole double-throw switch is connected to a fourth input/output end of the switching unit, a first fixed end of the second single-pole double-throw switch is connected to the second input/output end of the switching unit, and a second fixed end of the second single-pole double-throw switch is connected to the first input/output end of the switching unit.

4. The two-gang dimmer according to claim 1, wherein the switching unit comprises a double-pole double-throw switch; and the double-pole double-throw switch is used as a reversing switch of a first input/output end, a second input/output end, a third input/output end and a fourth input/output end of the switching unit.

5. A line checking method for the two-gang dimmer, applied to the two-gang dimmer according to claim 1, comprising:

controlling a switching unit, such that two input/output ends of a master module are connected to one input/output end of a slave module separately;

detecting a voltage value of an input signal at a sampling end of a sampling unit; and determining, in response to determining that the voltage value is not within a preset voltage range, that lines of the master module and the slave module are reversely connected, and switching a connection relation between the master module and the slave module by means of the switching unit.

6. The line checking method for the two-gang dimmer according to claim 5, wherein the master module further comprises a silicon controlled rectifier unit;

a power input end of the master module is configured to be connected to a power supply, and the power input end of the master module is connected to the first input/output end of the master module and an input end of the sampling unit by means of the silicon controlled rectifier unit respectively; and a sampling end of the sampling unit is connected to a second power input/output end of the master module; and the silicon controlled rectifier unit is configured to adjust a voltage output to a load.

7. The line checking method for the two-gang dimmer according to claim 6, wherein the slave module further comprises a button differential unit;

an input end of the button differential unit is connected to the first input/output end of the slave module, and an output end of the button differential unit is connected to the second input/output end of the slave module; and the button differential unit has several different button states, and a voltage drop between the input end and the output end is different at each button state.

8. The line checking method for the two-gang dimmer according to claim 7, wherein the button differential unit comprises N general-purpose diodes and N+1 button switches, wherein N≥1;

anodes and cathodes of the N general-purpose diodes are alternately connected in sequence and connected in series between the input end and the output end of the button differential unit; and a first end of an ith button switch is connected to an anode of an ith general-purpose diode, a first end of an (N+1)th button switch is connected to a cathode of an Nth general-purpose diode, and second ends of the N+1 button switches are all connected to the output end of the button differential unit, wherein $1 \leq i \leq N$.

9. The line checking method for the two-gang dimmer according to claim 5, wherein the master module further comprises a direct current conversion unit;

a power input end of the master module is configured to be connected to a power supply, and the power input end of the master module is connected to the first input/output end of the master module and an input end of the sampling unit by means of the direct current conversion unit respectively; and a sampling end of the sampling unit is connected to a second power input/output end of the master module; and the direct current conversion unit is configured to convert an alternating current input from the power input end of the master module into a direct current so as to be output.

10. The line checking method for the two-gang dimmer according to claim 5, wherein the switching unit comprises two single-pole double-throw switches comprising a first single-pole double-throw switch and a second single-pole double-throw switch;

a moving end of the first single-pole double-throw switch is connected to a third input/output end of the switching unit, a first fixed end of the first single-pole double-throw switch is connected to a first input/output end of the switching unit, and a second fixed end of the first single-pole double-throw switch is connected to a second input/output end of the switching unit; and a moving end of the second single-pole double-throw switch is connected to a fourth input/output end of the switching unit, a first fixed end of the second single-pole double-throw switch is connected to the second input/output end of the switching unit, and a second fixed end of the second single-pole double-throw switch is connected to the first input/output end of the switching unit.

11. The line checking method for the two-gang dimmer according to claim 5, wherein the switching unit comprises a double-pole double-throw switch; and the double-pole double-throw switch is used as a reversing switch of a first input/output end, a second input/output end, a third input/output end and a fourth input/output end of the switching unit.

12. A two-gang dimmer, comprising a master module, a slave module, a switching unit, and a forward-reverse connection differential unit, wherein four input/output ends on the switching unit are connected to a first input/output end and a second input/output end of the master module, and a first input/output end and a second input/output end of the slave module, respectively, and the switching unit is configured to switch a connection relation between the two input/output ends of the master module and the two input/output ends of the slave module;

two input/output ends of the forward-reverse connection differential unit are connected to the first input/output end and the second input/output end of the slave module, respectively; and the first input/output end of the master module outputs a power supply voltage to the first input/output end of the slave module; and a sampling unit of the master module determines a connection relation between the master module and the slave module by detecting a voltage drop between two ends of the forward-reverse connection differential unit; and the master module further comprises a silicon controlled rectifier unit;

a power input end of the master module is configured to be connected to a power supply, and the power input end of the master module is connected to the first input/output end of the master module and an input end of the sampling unit by means of the silicon controlled rectifier unit respectively; and a sampling end of the sampling unit is connected to a second power input/output end of the master module; and the silicon controlled rectifier unit is configured to adjust a voltage output to a load.

13. The two-gang dimmer according to claim 12, wherein the slave module further comprises a button differential unit;

an input end of the button differential unit is connected to the first input/output end of the slave module, and an output end of the button differential unit is connected to the second input/output end of the slave module; and the button differential unit has several different button states, and a voltage drop between the input end and the output end is different at each button state.

14. The two-gang dimmer according to claim 13, wherein the button differential unit comprises N general-purpose diodes and N+1 button switches, wherein $N \geq 1$;

anodes and cathodes of the N general-purpose diodes are alternately connected in sequence and connected in series between the input end and the output end of the button differential unit; and a first end of an ith button switch is connected to an anode of an ith general-purpose diode, a first end of an (N+1)th button switch is connected to a cathode of an Nth general-purpose diode, and second ends of the N+1 button switches are all connected to the output end of the button differential unit, wherein $1 \leq i \leq N$.

15. A line checking method for the two-gang dimmer, applied to the two-gang dimmer according to claim 12, comprising:

controlling a switching unit, such that two input/output ends of a master module are connected to one input/output end of a slave module separately;

detecting a voltage value of an input signal at a sampling end of a sampling unit;

determining, in response to determining that the voltage value is within a voltage range, that lines of the master module and the slave module are normally connected, and controlling a silicon controlled rectifier unit to supply power to a load; and adjusting a voltage output to the load by controlling the silicon controlled rectifier unit of the master module.

16. The line checking method for the two-gang dimmer according to claim 15, wherein the slave module further comprises a button differential unit; an input end of the button differential unit is connected to a first input/output end of the slave module, and an output end of the button differential unit is connected to a second input/output end of the slave module; the button differential unit has several different button states, and a voltage drop between the input end and the output end is different at each button state; and after the controlling a silicon controlled rectifier unit to supply power to a load, the method further comprises:

comparing a voltage collected by the sampling unit with a preset voltage-state table, determining a button state of the button differential unit, and controlling, according to the determined button state, the silicon controlled rectifier unit to output a corresponding output voltage to supply power to the load according to a preset state-voltage table, wherein the voltage-state table comprises a correspondence between the collected voltage and the button state, and the state-voltage table comprises a correspondence between the button state and the output voltage.

* * * * *